(12) United States Patent
Shao et al.

(10) Patent No.: US 12,007,751 B2
(45) Date of Patent: Jun. 11, 2024

(54) METHODS FOR SMART GAS DATA MANAGEMENT, INTERNET OF THINGS SYSTEMS, AND STORAGE MEDIA

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yaqiang Quan, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/460,554

(22) Filed: Sep. 3, 2023

(65) Prior Publication Data

US 2023/0409008 A1 Dec. 21, 2023

(30) Foreign Application Priority Data

Aug. 10, 2023 (CN) .......................... 202311002442.5

(51) Int. Cl.
G05B 19/4155 (2006.01)
(52) U.S. Cl.
CPC .................... *G05B 19/4155* (2013.01); *G05B 2219/41108* (2013.01)
(58) Field of Classification Search
None
See application file for complete search history.

(56) References Cited

U.S. PATENT DOCUMENTS 11,507,064 B2 *  11/2022  Cella ...................... H04B 17/23
2016/0209310 A1    7/2016  Scheucher et al.

FOREIGN PATENT DOCUMENTS

| CN | 108831132 A | 11/2018 |
| CN | 110913023 A | 3/2020 |
| CN | 111539563 A | 8/2020 |
| CN | 112068456 A | 12/2020 |
| CN | 112859728 A | 5/2021 |
| CN | 109101539 B | 7/2021 |
| CN | 113176094 A | 7/2021 |
| CN | 114757270 A | 7/2022 |

(Continued)

OTHER PUBLICATIONS

Shao, Zehua et al., Rrsearch on Gateway Technology for IoT Operation System of Intelligent Gas Meter, Gas & Heat, 2022, 5 pages.

(Continued)

*Primary Examiner* — Ryan A Jarrett
(74) *Attorney, Agent, or Firm* — METIS IP LLC (57) ABSTRACT

Embodiments of the present disclosure provide a method, an Internet of Things system, and a storage medium for smart gas data management. The method includes: obtaining at least one type of raw gas data uploaded by at least one platform in the IoT system, wherein the raw gas data includes at least one of gas transportation data, gas pipeline data, and gas equipment data; evaluating a time reliability and a data reliability of the at least one type of the raw gas data; and generating at least one storage instruction based on the time reliability and the data reliability of the at least one type of the raw gas data to store the raw gas data in a corresponding data storage area.

7 Claims, 4 Drawing Sheets

(56) References Cited

FOREIGN PATENT DOCUMENTS

| | | |
|---|---|---|
| CN | 114781799 A | 7/2022 |
| CN | 115063008 A | 9/2022 |
| CN | 115512520 A | 12/2022 |
| CN | 116149279 A | 5/2023 |
| CN | 116208633 A | 6/2023 |
| CN | 116498908 A | 7/2023 |

OTHER PUBLICATIONS

Notification to Grant Patent Right for Invention in Chinese Application No. 202311002442.5 dated Oct. 23, 2023, 4 pages.
First Office Action in Chinese Application No. 202311002442.5 dated Sep. 13, 2023, 11 pages.

\* cited by examiner

METHODS FOR SMART GAS DATA MANAGEMENT, INTERNET OF THINGS SYSTEMS, AND STORAGE MEDIA

CROSS-REFERENCE TO RELATED APPLICATIONS

This application claims priority to Chinese Patent Application No. 202311002442.5, filed on Aug. 10, 2023, the entire contents of which are hereby incorporated by reference.

TECHNICAL FIELD

The present disclosure generally relates to the field of gas data processing, and in particular, to a method for smart gas data management, an Internet of Things system, and a storage medium.

BACKGROUND

With the development of smart cities, gas business has entered the era of big data. There is a large amount of gas data in the gas business, which puts a significant processing pressure on the data processing center.

CN109101539B provides a method for evaluating a quality of business data. The application evaluates the completeness of gas data more comprehensively by analyzing the upload time of the data after the upload is completed, the upload range of the data, the upload business volume of the data, and the upload content of the data in a multi-dimensional manner, but it does not deal with evaluating the timeliness of the gas data, and how to management of data storage.

Therefore, a method for smart gas data management, an IoT system, and a storage medium are provided to implement a comprehensive evaluation of the timeliness and completeness of gas data, as well as efficient management of data storage.

SUMMARY

One or more embodiments of the present disclosure provide a method for smart gas data management, wherein the method is executed by a smart gas management platform of an Internet of Things (IoT) system for smart gas data management, comprising: obtaining at least one type of raw gas data uploaded by at least one platform in the IoT system, wherein the raw gas data includes at least one of gas transportation data, gas pipeline data, and gas equipment data; evaluating a time reliability and a data reliability of the at least one type of the raw gas data; and generating at least one storage instruction based on the time reliability and the data reliability of the at least one type of the raw gas data to store the raw gas data in a corresponding data storage area.

One or more embodiments of the present disclosure provide an Internet of Things (IoT) system for smart gas data management, wherein the IoT system comprises a smart gas user platform, a smart gas service platform, a smart gas management platform, a smart gas sensing network platform, and a smart gas object platform; and the smart gas management platform is configured to: obtain at least one type of raw gas data uploaded by at least one platform in the IoT system, wherein the raw gas data includes at least one of gas transportation data, gas pipeline data, and gas equipment data; evaluate a time reliability and a data reliability of the at least one type of the raw gas data; and generate at least one storage instruction based on the time reliability and the data reliability of the at least one type of the raw gas data to store the raw gas data in a corresponding data storage area.

One or more embodiments of the present disclosure provide a computer-readable storage medium storing computer instructions, wherein when reading the computer instructions in the storage medium, a computer implements the method for smart gas data management.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "unit," and/or "module" used herein are one method to distinguish different components, elements, parts, sections, or assemblies of different levels in ascending order. However, the terms may be displaced by other expressions if they may achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

Figure 1:
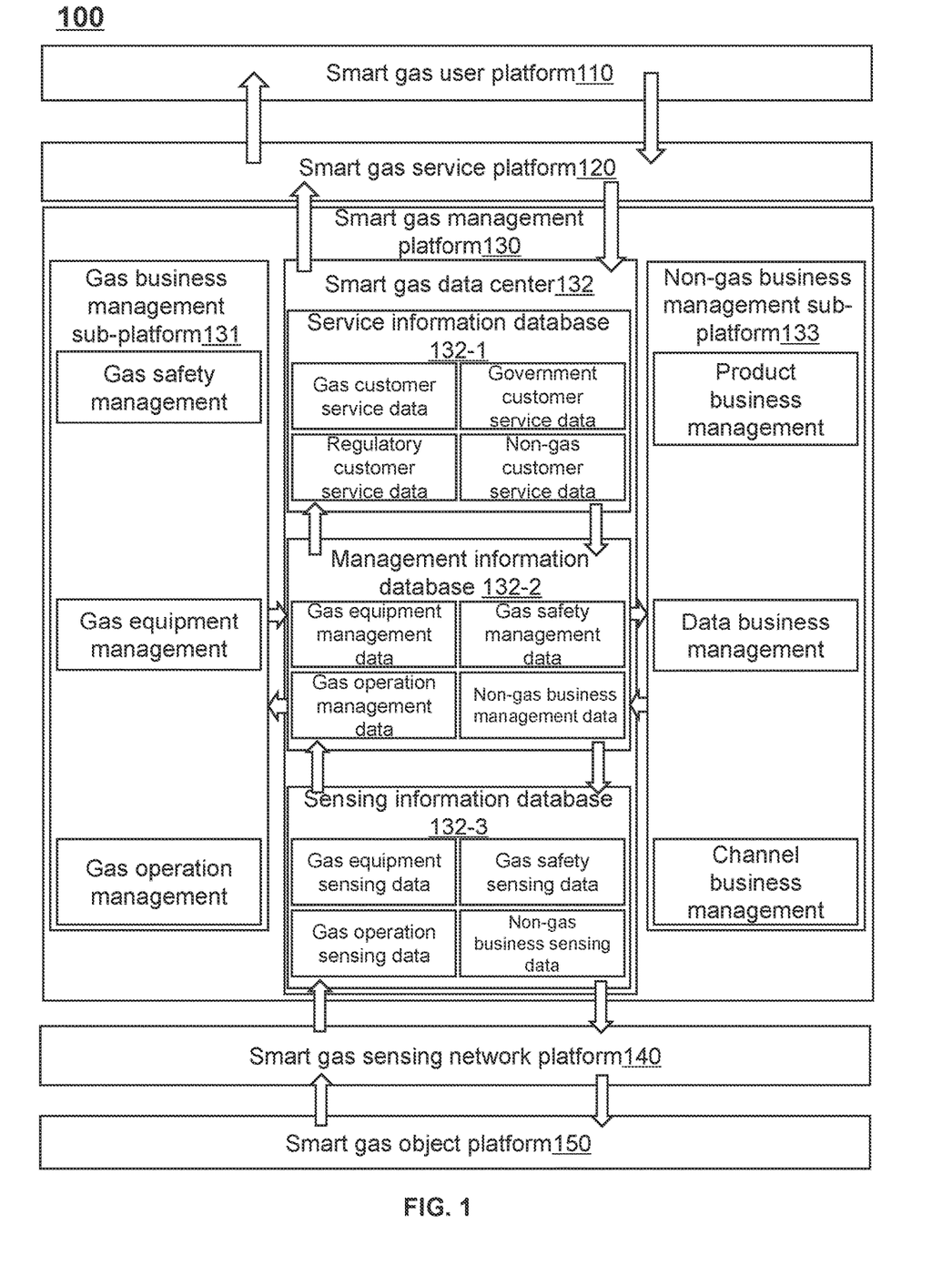
FIG. 1 is an exemplary schematic diagram of an IoT system for smart gas data management according to some embodiments of the present disclosure.

FIG. 1 is an exemplary schematic diagram of a IoT system 100 for smart gas data management according to some embodiments of the present disclosure.

As shown in FIG. 1, the IoT system 100 for smart gas data management may include a smart gas user platform 110, a smart gas service platform 120, a smart gas management platform 130, a smart gas sensing network platform 140, and a smart gas object platform 150.

The smart gas user platform 110 is a platform used to interact with users. In some embodiments, the smart gas user platform 110 may be configured as a terminal device.

The smart gas service platform 120 is a platform used to communicate the user's needs and control information. For example, the smart gas service platform 120 may obtain gas information from the smart gas management platform 130 and send it to the smart gas user platform 110.

The smart gas management platform is a platform that coordinates and harmonizes the connection and collaboration between various functional platforms and aggregates all the information of the IoT to provide perception management and control management functions for the IoT operation system.

In some embodiments, the smart gas management platform 130 may include a gas business management sub-platform 131, a smart gas data center 132, and a non-business management sub-platform 133.

The gas business management sub-platform 131 is a platform used to manage the gas business. In some embodiments, the gas business management sub-platform 131 may be used to perform gas safety management, gas equipment management, and gas operation management.

The non-gas business management sub-platform 133 is a platform used to manage non-gas business. In some embodiments, the non-gas business management sub-platform 133 may be used to perform product business management, data business management, and channel business management.

The smart gas data center 132 may be used to store and manage all operational information of the IoT system 100 for smart gas data management. In some embodiments, the smart gas data center 132 may be configured as a storage device for storing data related to gas information, etc.

In some embodiments, the smart gas data center 132 may include a service information database 132-1, a management information database 132-2, and a sensing information database 132-3. The service information database 132-1 is used to store service information data, including gas customer service data, government customer service data, regulatory customer service data, and non-gas customer service data. The management information database 132-2 is used to store management information data, including gas equipment management data, gas safety management data, gas operation management data, and non-gas business management data. The sensing information database 132-3 is used to store sensing information data, including gas equipment sensing data, gas safety sensing data, gas operation sensing data, and non-gas business sensing data.

The management information database 132-2 interacts bi-directionally with the sensing information database 132-3 and the service information database 132-1, respectively. The sensing information database 132-3 interacts with the smart gas sensing network platform 140, and the service information database 132-1 interacts with the smart gas service platform 120. The gas business management sub-platform 131 and the non-gas business management sub-platform 133 interact with the management information database 132-2 to obtain information, retrieve corresponding management data from the management information database 132-2, and send management instructions to the management information database 132-2. The management information database 132-2 is further sent to the service information database 132-1 or the sensing information database 132-3 as required by the instructions to achieve the external transmission of information.

In some embodiments, the smart gas management platform 130 may interact with the smart gas service platform 120 and the smart gas sensing network platform 140 through the smart gas data center 132, respectively. For example, the smart gas data center 132 may send gas data to the smart gas service platform 120. As another example, the smart gas data center may send an instruction to obtain gas data to the smart gas sensing network platform 140 to obtain the gas data.

In some embodiments, the smart gas management platform 130 (e.g., the smart gas data center 132) may be used to obtain raw gas data uploaded from at least one platform of the IoT system 100 for smart gas data management. Among them, the at least one platform may include the smart gas service platform 120, the smart gas sensing network platform 140, the gas business management sub-platform 131, and the non-gas business management sub-platform 133.

The smart gas sensing network platform 140 is a functional platform for managing sensing communications. In some embodiments, the smart gas sensing network platform 140 may be configured as a communication network and gateway to fulfill the functions of perceptual information sensing communication and controlling information sensing communication.

The smart gas object platform 150 is a functional platform for sensing information generation and controlling information execution. In some embodiments, the smart gas object platform 150 may be configured with various types of gas equipment and monitoring devices to obtain information about the gas network (e.g., gas transportation data, gas pipeline data, gas equipment data, etc.).

Some embodiments of the present disclosure, the IoT system 100 for smart gas data management may form a closed loop of information operation between the smart gas object platform 150 and the smart gas user platform 110, and operate regularly under the unified management of the smart gas management platform 130, so as to achieve the information and intelligence of gas data management.

Figure 2:
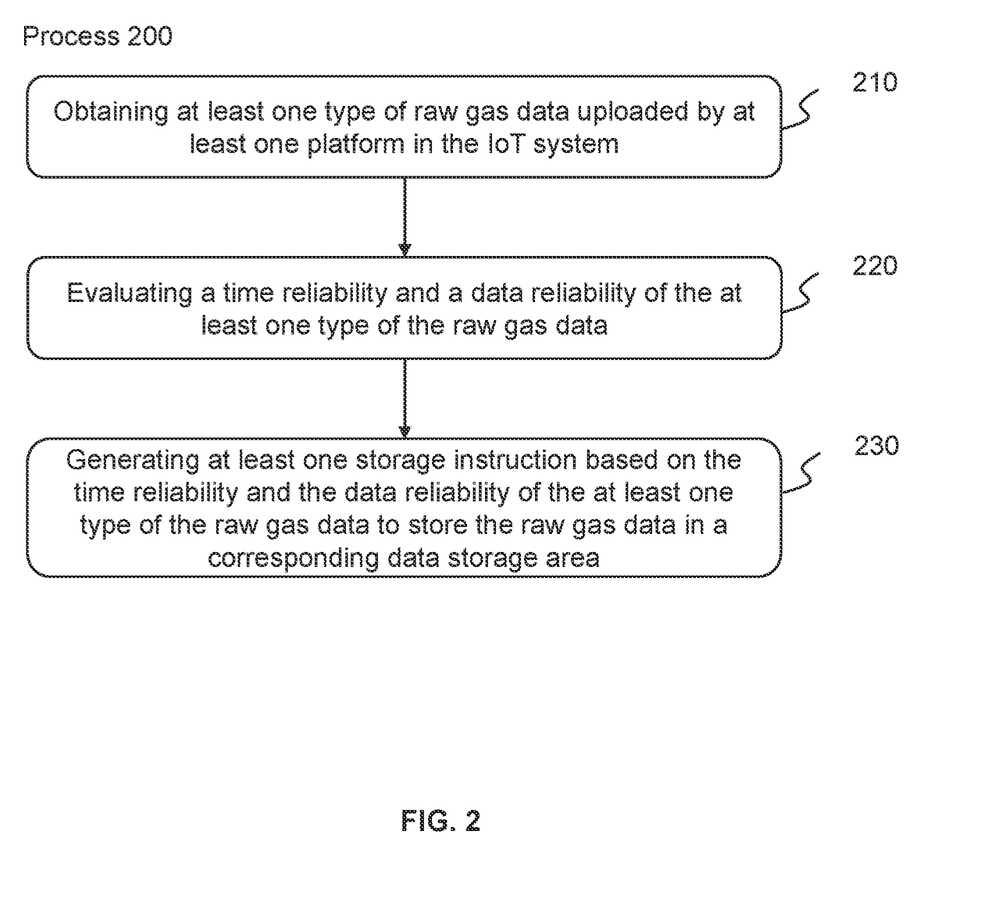
FIG. 2 is an exemplary flowchart of a method for smart gas data management according to some embodiments of the present disclosure.

FIG. 2 is an exemplary flowchart of a method for smart gas data management shown according to some embodiments of the present disclosure. In some embodiments, process 200 may be performed based on the smart gas management platform. As shown in FIG. 2, process 200 includes the following steps:

Step 210, obtaining at least one type of raw gas data uploaded by at least one platform in the IoT system.

The raw gas data refers to data related to gas. In some embodiments, the raw gas data may include at least one of gas transportation data, gas pipeline data, and gas equipment data.

The gas transportation data refers to data related to the transportation of gas. For example, gas transportation data may include a gas pressure, gas flow rate, gas temperature, or the like.

The gas pipeline data refers to data related to the pipelines used for gas transportation. For example, gas pipeline data may include acoustic information emitted by the pipeline, cracks in the pipeline, burial depth of the pipeline, and material of the pipeline.

The gas equipment data refers to data generated by the gas equipment configured in the smart gas object platform. For example, gas equipment includes a gas meter, a valve control device, a gas flow meter, or the like. For example, gas equipment data may include a gas consumption and a gas usage time.

In certain embodiments, the smart gas management platform may interact with at least one platform of the IoT system for smart gas data management based on the smart gas data center in order to obtain raw gas data uploaded by the at least one platform. At least one of these platforms includes a smart gas service platform, a smart gas sensing network platform, a gas business management sub-platform, and a non-gas business management sub-platform.

Step 220 evaluating a time reliability and a data reliability of the at least one type of the raw gas data.

The time reliability may be configured to reflect whether the platform uploads raw gas data in a timely manner. The greater the time reliability, the more timely the platform uploads the raw gas data. The platform uploading the raw gas data in a timely manner indicates a small time interval between obtaining the data and uploading the data.

The data reliability refers to a reliability of the quality of the raw gas data. The greater the data reliability, the more reliable and higher quality the raw gas data is. In some embodiments, the data reliability may measure the completeness of the raw gas data.

In some embodiments, the smart gas management platform may evaluate the time reliability and the data reliability of the raw gas data in a variety of ways. For example, the time reliability may be related to the upload time of the raw gas data, and the closer the upload times of neighboring raw gas data, the greater the time reliability. Here, neighboring raw gas data refers to raw gas data with neighboring upload times. For example, the data reliability may be related to the completeness of the raw gas data, and the greater the completeness of the raw gas data, the higher the data reliability. The smart gas management platform may compare the raw gas data with the standard gas data to determine the integrity of the raw gas data. Standard gas data refers to gas data with satisfactory integrity.

In some embodiments, for each type of the raw gas data, the smart gas management platform may determine the collection time characteristics of the raw gas data and evaluate the time reliability of the raw gas data based on the collection time characteristics. For more information about collection time characteristics and the time reliability, please refer to FIG. 3 and its related description.

In some embodiments, for each type of raw gas data, the smart gas management platform may determine at least one set of gas sampling data for the raw gas data and evaluate the data reliability of the raw gas data based on the at least one set of gas sampling data. For more information on determining data reliability, please refer to FIG. 4 and its associated description.

Step 230, generating at least one storage instruction based on the time reliability and the data reliability of the at least one type of the raw gas data to store the raw gas data in a corresponding data storage area.

A storage instruction refers to an instruction that stores the raw gas data into the corresponding data storage area. In some embodiments, there may be one or more storage instructions.

In some embodiments, the smart gas management platform may generate storage instructions based on the time reliability and the data reliability of the at least one type of raw gas data. For example, the storage instructions generated by the smart gas management platform may include storing the raw gas data whose time reliability and/or data reliability is higher than a corresponding threshold in a same storage area; and storing the raw gas data whose time reliability and/or data reliability is not higher than a corresponding threshold in a same storage area.

As another example, the storage instructions generated by the smart gas management platform may include storing the raw gas data whose time reliability and/or data reliability is higher than a corresponding threshold in a storage area (e.g., memory or cache) with a fast read speed as a priority storage; and storing the raw gas data with the time reliability and/or data reliability below the corresponding threshold in a storage area (e.g., hard disk or external disk) with a slower read speed. Thresholds corresponding to the time reliability and/or data reliability may be determined based on historical experience.

In some embodiments of the present disclosure, different processing tasks have different needs for the time reliability and data reliability of the raw gas. By categorizing the raw gas data according to the time reliability and data reliability of the at least one type of raw gas data, storing the raw gas data in the corresponding data storage area can improve the convenience and efficiency of using the data.

Figure 3:
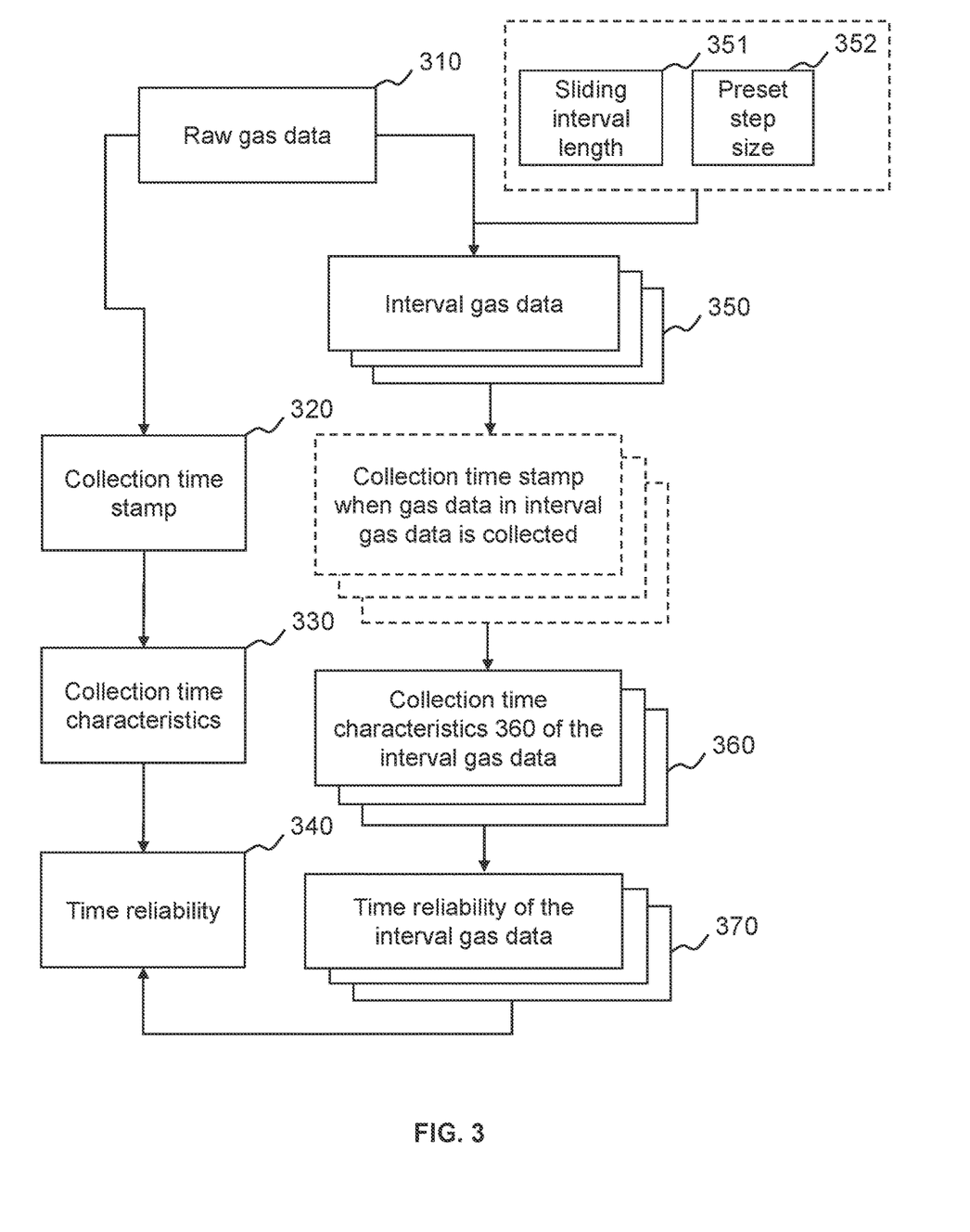
FIG. 3 is an exemplary schematic diagram illustrating a determination of a time reliability according to some embodiments of the present disclosure.

FIG. 3 is an exemplary schematic diagram illustrating a determination of a time reliability according to some embodiments of the present disclosure.

In some embodiments, the smart gas management platform may determine the time reliability of raw gas data for each type.

In some embodiments, refer to FIG. 3, for each type of raw gas data, the smart gas management platform may calculate collection time characteristics 330 of raw gas data 310 based on a collection time stamp 320 when the gas data in the raw gas data 310 is collected; and evaluating a time reliability 340 of the raw gas data 310 based on the collection time characteristics 330.

For more information about the raw gas data, refer to the relevant description in FIG. 2.

The collection time stamp refers to the time and other information when the raw gas data is collected.

The collection time characteristics refer to characteristics related to the collection time. For example, the collection time characteristics may include the average collection time difference, the collection time coverage, etc.

The average collection time difference may be used to measure the difference in the collection time stamps between individual gas data in the raw gas data.

In some embodiments, the smart gas management platform may calculate the difference in the collection time stamps of gas data collected at each of two neighboring times, and determine the average collection time difference based on the average of all differences.

The collection time coverage may be used to characterize the degree of coverage of collection time stamps in a preset time period. A preset time period refers to a pre-set range of time during which raw gas data needs to be collected.

In some embodiments, the smart gas management platform may calculate the ratio of the collection time stamps of individual gas data in the raw gas data over a preset time period to determine the collection time coverage. For example, the smart gas management platform may evenly divide the preset time period into several sub-time periods, select the sub-time periods whose collection time stamps fall within and include them as candidate sub-time periods, and determine the ratio of the sum of the time lengths of the candidate sub-time periods to the preset time period as the collection time coverage rate.

The time reliability of the raw gas data may be evaluated in various ways. In some embodiments, the smart gas management platform may perform modeling or use various data analysis algorithms (e.g., regression analysis, discriminant analysis, etc.) to analyze and process the collection time characteristics and evaluate the time reliability of the raw gas data.

In some embodiments, the smart gas management platform may evaluate the time reliability of the raw gas data based on the collection time characteristics and pre-set rules. Example preset rules may be: the shorter the average collection time difference, the greater the collection time coverage, and the higher the time reliability.

In some embodiments, see FIG. 3, the smart gas management platform may divide the raw gas data 310 into a plurality of time intervals corresponding to interval gas data 350 based on a sliding interval length 351 and a preset step size 352. Further, the smart gas management platform may evaluate collection time characteristics 360 of the interval gas data within each time interval and determine a time reliability of the interval gas data within each time interval 370; and determine the time reliability 340 of the raw gas data 310 based on the time reliability of the interval gas data 370 within the each time interval.

A sliding interval is a window in which the raw gas data is divided by sliding.

The sliding interval length refers to the amount of data from the raw gas data contained within the sliding interval, i.e., the length of the sliding interval. The preset step size is the amount of data spaced between neighboring sliding intervals.

The time interval refers to the interval obtained by dividing the raw gas data into intervals according to the sliding interval length and the preset step size. In some embodiments, the smart gas management platform may divide the raw gas data into intervals based on the amount of data, yielding corresponding time intervals. In some embodiments, the time interval may be a range of intervals determined based on the start data location and the end data location. For example, the time interval [A, B] represents a start location with the collection time stamp corresponding to the data A and an end location with the collection time stamp corresponding to the data B.

In some embodiments, the smart gas management platform may slide the sliding interval from front to back based on the sequence of the collection time. Each time the smart gas management platform slides a sliding interval according to the preset step size, and a segment of the raw gas data is intercepted and determined as interval gas data. This process is repeated until all the raw gas data is intercepted. For example, it supposes that the raw gas data includes gas data 1, gas data 2, . . . , and gas data n. With the sliding interval length of 3 and the preset step size of 2, the following interval gas data may be obtained: (gas data 1, gas data 2, gas data 3), (gas data 3, gas data 4, gas data 5), . . . , and (gas data n−2, gas data n−1, gas data n).

In some embodiments, the sliding interval length and the preset step size are associated with gas importance of the raw gas data. In some embodiments, the sliding interval length is positively correlated with the gas importance. In some embodiments, the preset step size is negatively correlated with the gas importance.

The gas importance may be used to measure the importance of the collected raw gas data. More information on the gas importance may be found in the related description of FIG. 4.

In some embodiments of the present disclosure, determining the size of the preset sliding interval and the preset step size by the gas importance can facilitate accurate division of the raw gas data by the smart gas management platform, reduce the omission of important data, and improve data reliability.

The interval gas data refers to the raw gas data located within a certain time interval.

The collection time characteristics of the interval gas data refer to the collection time characteristics of the raw gas data within the time interval.

The time reliability of the interval gas data refers to the time reliability of the raw gas data within the time interval. More information on the time reliability may be found in the related description of FIG. 2.

In some embodiments, the collection time characteristics of the interval gas data may be the same as those of the raw gas data, including the average collection time difference, collection time coverage, or the like. The determination manner of the collection time characteristics of the interval gas data is similar to that of the collection time characteristics of the raw gas data, with further explanation referred to in the relevant description above.

In some embodiments, the time reliability of the interval gas data may be determined based on the collection time characteristics of the interval gas data, similar to the manner of "determining the time reliability of the raw gas data based on the collection time characteristics of the raw gas data", as described above.

In some embodiments, the smart gas management platform may perform a weighted summation operation based on the time reliability of interval gas data 370 to obtain the time reliability 340 of the raw gas data 310. In some embodiments, the first weight of interval gas data may be the same. In some embodiments, the first weight of interval gas data may be different. For example, the first weight of interval gas data is related to the distance between the time interval corresponding to interval gas data and the current moment. The closer the time interval is to the current moment, the greater the first weight.

In some embodiments of the present disclosure, at least one set of interval gas data is obtained by processing the raw gas data using a sliding window, which can reduce the computation and analysis of a large amount of complex raw gas data, and thus reduce the complexity of the computation. Based on the at least one set of the interval gas data, the time reliability of the raw gas data can be obtained, and a higher accuracy rate can be achieved compared to directly processing the raw gas data.

In some embodiments of the present disclosure, each raw gas data is collected at a different time and on a different platform. Therefore, by evaluating the time reliability of the raw gas data through the collection time characteristics, the accuracy of the obtained time reliability can be improved, and the convenience and efficiency of analyzing the reliability of the raw gas data can be enhanced.

Figure 4:
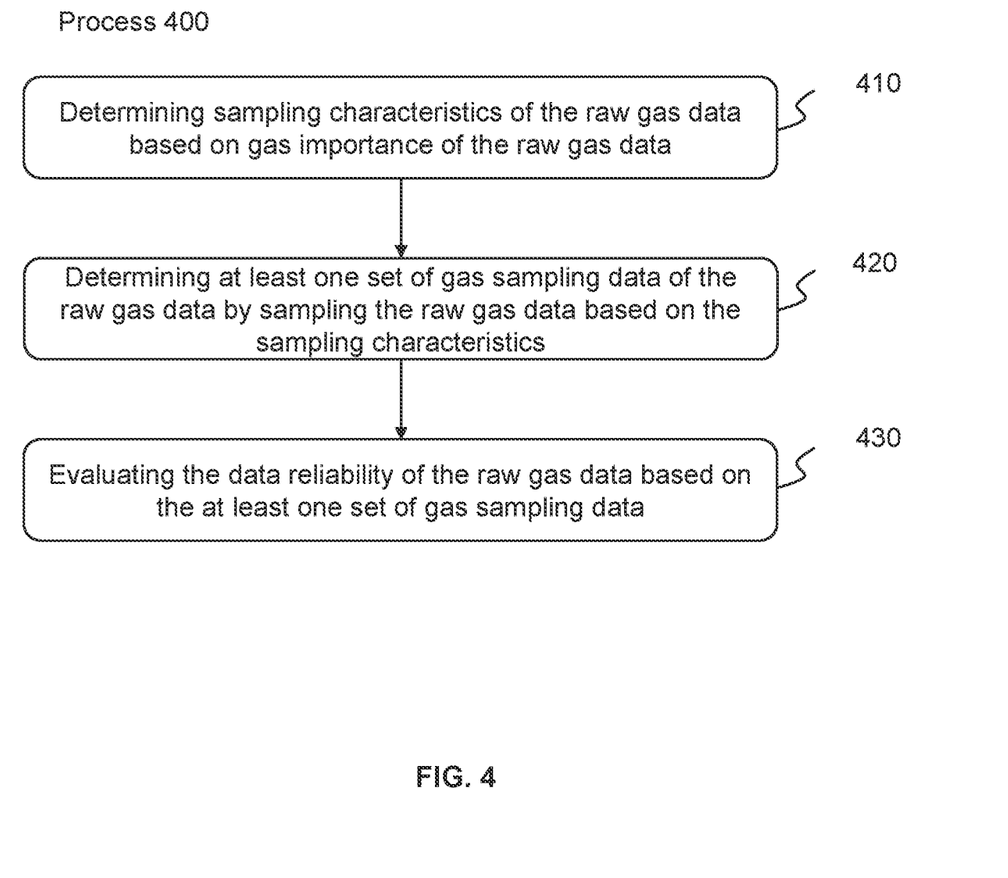
FIG. 4 is an exemplary flowchart illustrating a determination of a data reliability according to some embodiments of the present disclosure.

FIG. 4 is an exemplary flowchart illustrating a determination of a data reliability according to some embodiments of the present disclosure. In some embodiments, process 400 may be performed based on the smart gas service platform. As shown in FIG. 4, the process 400 includes the following steps:

In some embodiments, for each type of raw gas data, the smart gas service platform may evaluate the data reliability of the raw gas data based on the following steps.

Step 410, determining sampling characteristics of the raw gas data based on gas importance of the raw gas data.

More information about the raw gas data may be found in the related description of FIG. 2.

In some embodiments, the gas importance is related to gas data types, collection platforms for the gas data, and a localized network complexity of the gas network on which the gas data resides.

The gas data types refer to the types to which the raw gas data belongs. For example, the gas data types may include gas transportation data, gas pipeline data, gas equipment data, or the like. See FIG. 2 for a more detailed description of the gas data types.

The collection platforms for the gas data are platforms that collect the raw gas data. For example, one of the collection platforms for gas data may be a smart gas service platform.

The localized network complexity refers to the complexity of the localized area in the gas network where the raw gas data is located. The localized area may be the area where the raw gas data is collected.

In some embodiments, the smart gas management platform may determine the localized network complexity based on the count of gas pipelines surrounding the gas pipeline at which the point of collection of the raw gas data is located, the average count of incoming degrees or outgoing degrees of the surrounding gas pipelines, and the characteristics of the surrounding gas pipelines. The collection point location may be a location in the gas pipeline where the raw gas data is collected.

The count of surrounding gas pipelines refers to the count of gas pipelines within a predefined range from the collection point location. The predefined range may be set artificially. Surrounding gas pipeline characteristics may include the historical frequency of faults of the surrounding gas pipelines. The gas pipelines within the predefined range may be complete pipelines or partial pipeline segments. A complete pipeline refers to a segment of gas piping without branches. The partial pipeline segments may be a part of a complete pipeline. The historical fault frequencies may be obtained through statistical analysis.

The incoming reading for a gas pipeline is the count of upstream gas pipelines connected to that gas pipeline. The average entry count is the average of the entry counts for all gas pipelines within the predefined range. The outdegree of a gas pipeline is the count of downstream gas pipelines connected to that gas pipeline. The average outdegree is the average of the outputs of all gas pipelines within the predefined range.

In some embodiments, the greater the number of surrounding gas pipelines, the greater the average number of degrees in or average number of degrees out of the surrounding gas pipelines, and the greater the historical frequency of faults of the surrounding gas pipelines, the greater the localized network complexity.

The gas importance may be determined in a number of ways. For example, the smart gas management platform may preset a correspondence between different gas data types, different collection platforms for the gas data, and different gas importance degrees based on a priori knowledge, and based on the correspondence and the gas data types of the raw gas data, and the collection platforms for the gas data and the gas importance degree of the raw gas data may be determined.

In some embodiments, the smart gas management platform may determine the gas importance based on the gas data types, the collection platforms for the gas data, and the localized network complexity of the gas network in which the gas data is located. For example, the smart gas management platform may determine the base importance based on the gas data types, and the collection platforms for the gas data, and adjust the base importance based on the localized network complexity of the gas network in which the gas data is located to determine the gas importance. Where the base importance is the initially determined gas importance. The base importance may be determined based on the aforementioned determination of the gas importance.

Adjustment manners may include, for example, adjustment magnitude and adjustment direction. The magnitude of the adjustment is the size of the adjustment to the underlying importance. The adjustment direction may be used to determine the direction of the adjustment, e.g., to adjust the base importance up or down, etc.

In some embodiments, the adjustment to the base importance may be determined based on the localized network complexity. For example, when the localized network complexity is greater than a preset threshold, the adjustment direction is to turn up the base importance. As another example, the adjustment direction is to turn down the base importance when the localized network complexity is not greater than a preset threshold. The adjustment range is determined based on the correspondence between the reference localized network complexity and the reference adjustment range.

Sampling characteristics are the parameter characteristics of the raw gas data being sampled. For example, the sampling characteristics may include sampling rates, maximum sampling intervals, or the like.

The sampling rate is the percentage of sampled data in the raw gas data. For example, the sampling rate may be a ratio of the data amount of the gas sampling data to the total data amount of the raw gas data.

The maximum sampling interval refers to the maximum time interval between any two neighboring gas sampling data in the raw gas data.

In some embodiments, the smart gas management platform may establish a correspondence between the gas importance of different raw gas data and the sampling characteristics, and determine the sampling characteristics based on a look-up table.

In some embodiments, the smart gas management platform may determine the sampling characteristics of the raw gas data based on the gas importance of the raw gas data using a preset rule. Example preset rules may include: the greater the gas importance, the greater the sampling rate, and the smaller the maximum sampling interval.

In some embodiments, the smart gas management platform may determine the sampling characteristics of the raw gas data based on the gas importance of the raw gas data as well as the time reliability of the raw gas data.

In some embodiments, the smart gas management platform may statistically analyze the gas importance of the historical gas data and the time reliability of the historical gas data to determine a sampling characteristic rule and determine the sampling characteristics for the current moment based on the sampling characteristic rule. The historical gas data may be the raw gas data collected over a period of time in the past.

In some embodiments, the sampling characteristic rule may be that the greater the gas importance, the lower the time reliability, the greater the sampling rate, and the smaller the maximum sampling interval.

In some embodiments of the present disclosure, the sampling characteristics are determined by the gas importance and the time reliability, and the sampling rate can be adaptively adjusted to the collection time stamp of the raw gas data, which helps ensure the accuracy of the sampling. This is conducive to capturing multiple sampling points from the raw gas data, avoiding the omission of important data, and also avoiding the impact on the reliability judgment of the gas data.

Step 420, determining at least one set of gas sampling data of the raw gas data by sampling the raw gas data based on the sampling characteristics.

The gas sampling data refers to a portion of the raw gas data obtained by sampling the raw gas data.

In some embodiments, the smart gas management platform may randomly sample the raw gas data based on a sampling rate and a maximum sampling interval to obtain at least one set of gas sampling data.

In some embodiments, the smart gas management platform may generate a sampling probability distribution. At least one set of gas sampling data is generated based on the sampling probability distribution and sampling characteristics.

The sampling probability distribution may represent the probability of each gas data in the raw gas data being sampled. In some embodiments, the sampling probability distribution may be represented as a probability density curve (e.g., a normal distribution curve).

The sampling probability distribution may be obtained by presetting. In some embodiments, the sampling probability distribution may be a uniform probability distribution. A uniform probability distribution indicates that each gas data in the raw gas data has the same probability of being sampled as gas sampling data. In some embodiments, the sampling probability distribution may be a non-uniform probability distribution based on temporal distance. For example, the raw gas data with a collection time stamp closer to the current time has a higher probability of being selected as gas sampling data. As another example, data with collection time stamp further away from the current time has a lower probability of being selected as gas sampling data.

In some embodiments, the smart gas management platform may perform random sampling based on the sampling probability distribution and determine whether the sampling characteristics of the at least one set of gas sampling data after sampling satisfy the maximum sampling interval. In response to the sampling characteristics of at least one set of gas sampling data after sampling that do not satisfy the maximum sampling interval, the smart gas management platform may re-do random sampling by backtracking, re-sampling, etc., until the sampling characteristics are satisfied.

In some embodiments, the smart gas management platform may generate a sampling probability distribution based on the time reliability of the raw gas data. In this embodiment, different sampling intervals in the sampling probability distribution have different probability densities, and the probability densities of the sampling intervals in the sampling probability distribution correlate to the time reliability of the raw gas data within the sampling intervals.

The sampling intervals are a plurality of evenly divided time periods based on when the raw gas data was collected.

In some embodiments, the probability densities of the individual sampling intervals in the sampling probability distribution is positively correlated with the time reliability of the raw gas data within the individual sampling intervals. The higher the time reliability of the raw gas data within the sampling intervals, the higher the probability densities of the sampling intervals, and the greater the probability that the raw gas data within the sampling intervals may be selected as the gas sampling data. Accordingly, based on the time reliability of the raw gas data for each sampling interval, the probability density for each sampling interval may be determined to generate a sampling probability distribution.

In some embodiments of the present disclosure, different sampling intervals have different probability densities, which can enable different sampling intervals to correspond to different sampling characteristics, which is conducive to targeting sampling and improving the accuracy of the determination of the at least one set of gas sampling data.

In some embodiments, the smart gas management platform may sample the raw gas data based on a sampling probability distribution to obtain a plurality of sets of gas sampling data. The sampling method is determined by the sampling probability distribution. For example, if the sampling probability distribution is uniformly random, the raw gas data is uniformly randomly sampled. Another example is that if the sampling probability distribution is Gaussian, then the raw gas data is Gaussian sampled.

In some embodiments, generating the at least one set of gas sampling data is implemented by determining the sampling probability distribution. This approach allows for approximating the overall distribution based on a small amount of the gas sampling data, which helps to preserve the important information of the raw gas data.

Step 430, evaluating the data reliability of the raw gas data based on the at least one set of gas sampling data.

In some embodiments, the smart gas management platform may evaluate the data reliability of each set of gas sampling data, and determine the data reliability of the raw gas data based on the data reliability of each set of gas sampling data. The smart gas management platform may calculate the difference between the at least one set of gas sampling data and the preset gas sampling data, and based on this difference and the correspondence between different data reliability degrees and different differences, determine the data reliability degree for each set of gas sampling data. The preset gas sampling data may be highly reliable data verified by humans. The correspondence between different data reliability degrees and different differences can be determined based on prior knowledge or historical data.

In some embodiments, the smart gas service platform may determine at least one predictive gas characteristic based on gas sampling data using at least one predictive model; and evaluate the data reliability of the raw gas data corresponding to the gas sampling data based on the prediction accuracy of the at least one predictive gas characteristic.

The predictive gas characteristic refers to the characteristics related to gas that are predicted.

In some embodiments, the at least one predictive gas characteristic includes at least one of gas timing characteristics, gas spatial characteristics, and gas fault characteristics.

The gas timing characteristics refer to the temporal distribution characteristics of a predicted type of the raw gas data. For example, the gas timing characteristics may include the raw gas data at a future time point.

The gas spatial characteristics refer to the characterization of the spatial distribution of the raw gas data for one type of prediction. For example, the gas spatial characteristics may include the raw gas data from other points in the prediction. Other points are collection points other than those corresponding to the raw gas data.

The gas fault characteristics refer to the predicted probability of fault of one or more predefined fault types in the gas network. Types of faults may include gas leaks in gas pipelines, gas pipeline cracks, gas pipeline corrosion, etc. The types of faults may also include other types of accidents, such as, for example, gas pipeline break faults, faults in the regulating equipment at the regulating station, faults in broken gas storage tanks, and other accidents.

The predictive model may be used to determine at least one predictive gas characteristic. In some embodiments, the predictive model may include a temporal predictive model, a spatial predictive model, or the like.

The temporal predictive model may be used to predict gas timing characteristics. In some embodiments, the temporal predictive model may be a time series model such as a long short-term memory network (LSTM).

In some embodiments, the inputs to the temporal predictive model may include at least one set of gas sampling data, and the outputs may include raw gas data at a future time point. The set of gas sampling data may include gas data collected at multiple collection time stamps.

In some embodiments, the temporal predictive model may process the at least one set of gas sampling data from one type of raw gas data per execution. For example, when the gas sampling data input to the temporal predictive model is a portion of the gas transportation data obtained by sampling the gas transportation data, the output of the temporal predictive model is the gas transportation data at a future time point.

In some embodiments, the temporal predictive model may be processed for a plurality of times through the at least one set of gas sampling data, with the model output obtained from each processing being the raw gas data at a future time point. The raw gas data from a plurality of future time points form the gas timing characteristics.

In some embodiments, the temporal prediction model may be trained based on a large number of first training samples with the first label. In some embodiments, the first training sample may include at least one set of sample gas sampling data for a plurality of sample historical time periods, and the first training sample may be obtained from historical data. In some embodiments, the first label is the gas transportation data for a future time point of the sample corresponding to the first training sample, and the first label may be determined by the processor or human labeling. Where the sample future time point is a time point after the sample historical time period, and the sample future time point is a historical time point.

The spatial predictive model may be used to predict the gas spatial characteristics. In some embodiments, the spatial predictive model may be a Graph Neural Network (GNN) model or any other graph model.

In some embodiments, the inputs to the spatial predictive model may include a gas mapping, and the outputs may be the gas spatial characteristics.

The gas mapping is a data structure consisting of nodes and edges, where the edges connect nodes, and the nodes and edges may have attributes.

The nodes for gas correspond to the pipe junctions. Node attributes may include the raw gas data, etc. For example, the node attributes may include at least one type of gas transportation data, gas pipeline data, and gas equipment data.

The edge may correspond to a pipe, such as an edge between two pipe junctions based on a direct connection of pipes. Edge attributes may reflect information related to gas pipelines. For example, the edge attributes may be gas pipeline data.

The properties of nodes and edges may be determined using various manners based on the underlying data. The data source may be a manner illustrated in other embodiments, or it may be another manner. The data may include current data as well as historical data.

It should be noted that in the gas mapping, there is at least one node or edge with an empty attribute. Accordingly, the spatial predictive model may output nodes or edges with empty attributes, i.e., the output of the spatial predictive model includes the gas spatial characteristics at a plurality of pipelines or pipeline junctions. Accordingly, the gas spatial characteristics output by the spatial predictive model may include the raw gas data from other nodes or edges in the prediction. Other nodes or edges refer to nodes or edges other than those corresponding to the raw gas data.

In some embodiments, the spatial predictive model may be obtained based on a large number of second training samples trained with the second label. In some embodiments, the second training samples may include sample gas maps, and the second training samples may be historical gas maps determined from historical data. The nodes and their attributes, as well as the edges and their attributes, of the historical gas maps are similar to those described above. The second label may represent actual gas data corresponding to nodes or edges without attributes. The second label may be determined by the processor or human labeling.

In some embodiments, at least one predictive model includes a fault predictive model. The smart gas management platform may process the gas sampling data corresponding to the at least one type of raw gas data based on the fault predictive model to determine gas fault characteristics.

The fault predictive model may be used to predict the gas fault characteristics. In some embodiments, the fault predictive model may be a machine learning model, such as a neural network model.

In some embodiments, the input of the fault predictive model may include a plurality of sets of gas sampling data corresponding to the gas transportation data and the gas pipeline data, and the output of the fault predictive model may include gas fault characteristics.

In some embodiments, the fault predictive model may be obtained by training with a large number of third training samples with the third label. In some embodiments, the third training samples may include sample gas transportation data and sample gas pipeline data, which may be obtained from historical data. In some embodiments, the third label represents the gas fault characteristics corresponding to the third training samples, and the third label may be determined by the processor or human labeling.

In some embodiments of the present disclosure, by determining a probability distribution of fault types based on the fault predictive model, it is possible to efficiently and accurately predict the types of faults that are likely to occur and to improve the efficiency and accuracy of subsequent data reliability determinations.

The prediction accuracy may be used to characterize how accurately the predictive gas characteristic is. Each predictive gas characteristic corresponds to a prediction accuracy.

In some embodiments, the smart gas management platform may determine a prediction accuracy of the gas timing characteristics based on a difference between the predicted results of the gas timing characteristics and the actual timing results (hereinafter referred to as the first difference). For example, the result of (1—first difference) may be used as the prediction accuracy of the gas timing characteristics. Where the actual timing results are the gas timing characteristics actually acquired after a future point in time.

In some embodiments, the smart gas management platform may determine the prediction accuracy of the gas spatial characteristics based on a difference between the predicted result of the gas spatial characteristics and the spatial actual result (hereinafter referred to as the second difference). For example, the result of (1—second difference) may be used as the prediction accuracy of the gas special characteristics. Where the spatial actual results are the gas spatial characteristics that are actually acquired after a future point in time.

It is noted that when there are a plurality of determined gas timing characteristics, there may be a plurality of first differences (i.e., the prediction accuracy of the gas timing characteristics). When there are a plurality of determined gas spatial characteristics, there may be a plurality of second differences (i.e., the prediction accuracy of the gas spatial characteristics).

In some embodiments, the smart gas management platform may determine the prediction accuracy of the gas fault characteristics based on the probability of a fault in the gas fault characteristics and whether or not the fault actually occurred. Whether or not a fault actually occurs may be recorded as 0 or 1, with 0 indicating that the fault did not actually occur and 1 indicating that the fault did actually occur. For example, the prediction accuracy of the gas fault characteristics may be determined by subtracting the absolute value of the difference between the probability of a fault and whether or not the fault actually occurred (i.e., 0 or 1) from 1.

In some embodiments of the present disclosure, the gas timing characteristics, gas spatial characteristics, gas fault characteristics, or the like, may be further improved by determining them respectively with at least one predictive model, which can further improve the efficiency of the data processing and enhance the accuracy of the prediction.

In some embodiments, the smart gas management platform may determine the data reliability based on the prediction accuracy of the one or more predictive gas characteristic using various means like averaging or weighted summing.

In some embodiments, the smart gas management platform may obtain a data reliability by weighted summing based on the prediction accuracy of the at least one predictive gas characteristic.

In some embodiments, the weight of the prediction accuracy of the at least one predictive gas characteristic is related to the temporal distance or spatial distance of the item to which the prediction accuracy belongs.

The item to which the prediction accuracy belongs refers to the weighted object. The weighted object may include the prediction accuracy of at least one gas timing characteristics, the prediction accuracy of at least one gas spatial characteristics, the prediction accuracy of at least one gas fault characteristics, or the like.

In some embodiments, the weight corresponding to the prediction accuracy of the gas timing characteristics is related to the temporal distance. The shorter the temporal distance, the greater the weight. Where the temporal distance is the distance between a future time point and a current time point. This future time point is the future time point corresponding to the gas timing characteristics.

In some embodiments, the weight corresponding to the prediction accuracy of the gas spatial characteristics is related to the spatial distance. The greater the spatial distance, the smaller the weight. Wherein the spatial distance is the average distance between other points corresponding to the gas spatial characteristics and one or more collection points corresponding to the raw gas data. For example, if the gas mapping includes gas transportation data from collection point 1 to collection point 3, and the prediction is the gas spatial characteristics at collection point 5, then the spatial distance is equal to (the distance between collection point 5 and collection point 1+the distance between collection point 5 and collection point 2+the distance between collection point 5 and collection point 3)/3.

In some embodiments, the nodes of the gas mapping may be collection point locations. In some embodiments, the distance between the collection point locations refers to the number of pipes between the nodes of the gas mapping. In some embodiments, the distance between the collection point locations refers to the number of pipes between the edges of the gas mapping.

In some embodiments of the present disclosure, it is more difficult to predict gas transportation data at more distant points in time and more distant points in space, and there is more uncertainty, which reduces the accuracy of the prediction. By determining the second weight based on the temporal distance or the spatial distance, the prediction results of the more recent points in time and the more recent points in space can be given a larger weight, thereby improving the efficiency and accuracy of computing the data reliability.

In some embodiments, the distance between the collection point locations may be related to the count of pipes between the nodes of the gas mapping and the complexity coefficient of the gas network in which the pipes are located. For example, the distance between collection points may be the product of the count of pipes and the complexity coefficient.

The complexity coefficient may affect the distance. The complexity coefficient can be obtained either by the system or by predetermination.

In some embodiments, the smart gas management platform may determine a complexity coefficient corresponding to the current complexity of the localized pipe network based on a correspondence between different localized pipe network complexities and different complexity coefficients. More information about the complexity of localized pipe networks can be found in the description related to FIG. 3.

As the complexity of localized pipe networks increases the complexity and uncertainty of the pipes, in some embodiments of this present disclosure, spatial distances are determined by complexity coefficients to further improve the accuracy of data reliability.

In some embodiments, the weights of at least one prediction accuracy of the predicted gas characteristics may also be related to the temporal reliability of the sampling interval in which the corresponding at least one set of gas sampling data falls. The greater the temporal reliability of the sampling interval in which at least one set of gas sampling data falls, the greater the weight.

For more information about sampling intervals and temporal reliability, see the description related to FIG. 3.

In some embodiments of the present disclosure, determining the value of the weights by taking into account the time-reliability can enable gas sampling data with a higher time-reliability to have a higher weight, so that the time-reliability is correlated with the data reliability, further improving the accuracy of the data reliability.

In some embodiments, the weights for predicting the prediction accuracy of the at least one predicted gas feature may be the same or different.

In some embodiments, the smart gas management platform may determine the data reliability of the raw gas data by weighted summation based on the prediction accuracy of the at least one gas timing characteristics, the prediction accuracy of the at least one gas spatial characteristics.

In some embodiments, the smart gas management platform may further determine the data reliability of the raw gas data by weighted summation based on a prediction accuracy of the at least one gas timing characteristics, a prediction accuracy of the at least one gas spatial characteristics, and a prediction accuracy of the gas fault characteristics. Wherein, the prediction accuracy of the gas fault characteristics corresponds to a weight that is less than the other prediction accuracy belonging to the term.

It should be noted that it is difficult to quantify and estimate the prediction accuracy of the prediction results based on fault diagnosis, so the prediction accuracy of the prediction results based on fault diagnosis participates in weighting with a small weight. For example, a prediction based on fault diagnosis that there is a 60% chance of gas leak did not occur after actual testing, but this does not imply a low accuracy of the prediction.

In some embodiments of the present disclosure, at least one set of gas sampling data is determined by sampling, and the data reliability of the raw gas data is evaluated. This can reduce the computational load while accurately reflecting the important information of the raw gas data, resulting in a significant improvement in the efficiency of calculating the data reliability.

One or more embodiments of the present disclosure further provide a computer-readable storage medium storing computer instructions. When a computer reads the computer instructions from the storage medium, the computer executes the method for smart gas data management as described in any of the above embodiments.

One or more embodiments of the present disclosure further provide a device for smart gas data management including a processor, the processor is used to perform the method for smart gas data management as described in any of the above embodiments.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for smart gas data management implemented by a smart gas management platform of an Internet of Things (IoT) system for smart gas data management, comprising:
obtaining at least one type of raw gas data uploaded by at least one platform in the IoT system, wherein the raw gas data includes at least one of gas transportation data, gas pipeline data, and gas equipment data;
evaluating a time reliability and a data reliability of the at least one type of the raw gas data; wherein evaluating the time reliability of the at least one type of the raw gas data includes:
calculating collection time characteristics of the raw gas data based on a collection time stamp when the raw gas data is collected; and
evaluating the time reliability of the raw gas data based on the collection time characteristics; and
the evaluating the time reliability of the at least one type of the raw gas data further includes:
dividing the raw gas data into interval gas data corresponding to a plurality of time intervals based on a sliding interval length and a preset step size:
evaluating collection time characteristics of interval gas data within each time interval and determining a time reliability of the interval gas data within the each time interval; and
determining the time reliability of the raw gas data based on the time reliability of the interval gas data within the each time interval; and wherein
evaluating the data reliability of the at least one type of the raw gas data includes:
determining sampling characteristics of the raw gas data based on gas importance of the raw gas data, the gas importance being related to at least one of gas data types, collection platforms for the gas data, or a localized network complexity of a gas network in which the gas data is located;
determining at least one set of gas sampling data of the raw gas data by sampling the raw gas data based on the sampling characteristics; and
evaluating the data reliability of the raw gas data based on the at least one set of gas sampling data; and
generating at least one storage instruction based on the time reliability and the data reliability of the at least one type of the raw gas data to store the raw gas data in a corresponding data storage area.

2. The method of claim 1, wherein the determining sampling characteristics of the raw gas data based on gas importance of the raw gas data includes:
determining the sampling characteristics of the raw gas data based on the gas importance and the time reliability of the raw gas data.

3. The method of claim 1, wherein the determining at least one set of gas sampling data of the raw gas data by sampling the raw gas data based on the sampling characteristics includes:
generating a sampling probability distribution; and
generating the at least one set of gas sampling data based on the sampling probability distribution and the sampling characteristics.

4. The method of claim 1, wherein the evaluating the data reliability of the raw gas data based on the at least one set of gas sampling data includes:

determining at least one predictive gas characteristic through at least one predictive model based on the gas sampling data, the at least one predictive gas characteristic including at least one of a gas timing characteristic, a gas spatial characteristic, and a gas fault characteristic; and
evaluating the data reliability of the raw gas data corresponding to the gas sampling data based on a prediction accuracy of the at least one predictive gas characteristic.

5. The method of claim 4, wherein the at least one predictive model includes a fault predictive model; and the determining at least one predictive gas characteristic through at least one predictive model based on the gas sampling data includes:
processing the gas sampling data corresponding to the raw gas data based on the fault predictive model to determine the gas fault characteristic, the fault predictive model being a machine learning model.

6. An Internet of Things (IoT) system for smart gas data management, wherein the IoT system comprises a smart gas user platform, a smart gas service platform, a smart gas management platform, a smart gas sensing network platform, and a smart gas object platform; and the smart gas management platform is configured to:
obtain at least one type of raw gas data uploaded by at least one platform in the IoT system, wherein the raw gas data includes at least one of gas transportation data, gas pipeline data, and gas equipment data;
evaluate a time reliability and a data reliability of the at least one type of the raw gas data; wherein the smart gas management platform is further configured to:
calculate collection time characteristics of the raw gas data based on a collection time stamp when the raw gas data is collected; and
calculate the time reliability of the raw gas data based on the collection time characteristics; wherein the smart gas management platform is further configured to:
divide the raw gas data into interval gas data corresponding to a plurality of time intervals based on a sliding interval length and a preset step size;
evaluate collection time characteristics of interval gas data within each time interval and determining a time reliability of the interval gas data within the each time interval; and
determine the time reliability of the raw gas data based on the time reliability of the interval gas data within the each time interval; and wherein
the smart gas management platform is configured to:
determine sampling characteristics of the raw gas data based on gas importance of the raw gas data, the gas importance being related to at least one of gas data types, collection platforms for the gas data, or a localized network complexity of a gas network in which the gas data is located;
determine at least one set of gas sampling data of the raw gas data by sampling the raw gas data based on the sampling characteristics; and
evaluate the data reliability of the raw gas data based on the at least one set of gas sampling data; and
generate at least one storage instruction based on the time reliability and the data reliability of the at least one type of the raw gas data to store the raw gas data in a corresponding data storage area.

7. A non-transitory computer-readable storage medium storing computer instructions, wherein when reading the computer instructions in the storage medium, a computer implements the method for smart gas data management of claim 1.

* * * * *